March 4, 1941. A. B. KISH 2,233,868
ANALYTICAL BALANCE
Filed July 10, 1939 6 Sheets-Sheet 1

INVENTOR
Albert B. Kish
BY
ATTORNEY

March 4, 1941.  A. B. KISH  2,233,868

ANALYTICAL BALANCE

Filed July 10, 1939  6 Sheets-Sheet 2

INVENTOR
Albert B. Kish
BY
ATTORNEY

Fig. 12.

March 4, 1941.  A. B. KISH  2,233,868
ANALYTICAL BALANCE
Filed July 10, 1939   6 Sheets-Sheet 5

HAIR LINE PROJECTOR
Fig.17.

Fig.18.

INVENTOR
Albert B. Kish
BY
ATTORNEY

Fig. 16.

Patented Mar. 4, 1941

2,233,868

UNITED STATES PATENT OFFICE 2,233,868

ANALYTICAL BALANCE

Albert B. Kish, Newark, N. J.

Application July 10, 1939, Serial No. 283,562

11 Claims. (Cl. 265—54)

This invention relates to new and useful improvements in an analytical balance.

The invention relates particularly to a device for measuring and indicating weight by the force of gravitation and to certain of such devices and indicating instruments. Especially the invention proposes the provision of efficient mechanism to be substituted for the conventional standard pointer usually used in indicating instruments of the class mentioned.

The principal object of this invention is the construction of an analytical balance of extreme sensitivity obtained by eliminating the objectionable tangible pointer of prior balances. The elimination of the pointer will decrease the weight of the beam not only by the weight of the pointer itself but by the weight which must necessarily be added to the beam to counterbalance the pointer and to adjust the center of gravity of the moving system.

The invention also has for an object the construction of mechanism utilizing a hair line image to be thrown upon a mirror and reflected in a certain manner upon a scale, in a way so that the reading of the balance may be easy and efficiently taken. It is also proposed that the mechanical advantage of the system be relatively higher than that obtainable with the pointer type of indicator.

The invention contemplates mounting the mirror mentioned in the previous paragraph upon the beam of the balance so as to transmit its motion by reflecting said hair line upon a scale. The hair line image passing on the scale division of the index makes it possible to read the index with $\frac{1}{10}$ of one division accuracy without depending on our estimation of the fractional part of the scale division.

By estimating the distance between each division on the scale $\frac{1}{100}$ part of one division may be determined. This accurate reading of the index is due to the fact that the reflected hair line image doubles the actual distance of oscillation of the beam. This phenomenon is dependent on the well known law of light reflection that the incident and reflected rays make the same angles to the line drawn perpendicular to the reflecting surface.

As the distance between the mirror and the index will not influence the sensitiveness of balance, if this distance is selected only twice the length of the pointer, the hair line image will quadruple the distance on the indicator in comparison with the distance which would have been indicated by the pointer type of balance. Hence it is evident that if a balance under the force of a certain weight indicates four scale divisions difference on the index, if equipped with this reflecting indicator it will show a difference of at least 16 scale divisions. This index reading is easy to observe without any strain as it lays in a convenient reading angle.

A further object of this invention is to facilitate the weighing procedure with various guiding lines, and an electromagnetic control rider, and an electromagnetic starter and other mechanism which will facilitate the weighing procedure.

The invention also proposes to arrange guiding lights and control mechanism so that when a certain weight is placed on the pan to counterbalance the material to be weighed in the other pan, and the beam is released, the mechanism by flexing will indicate any excess weight on the other side of the balance, at the slightest movement of a control turn bottom. This arrangement makes it possible to quickly observe the end where additional weights must be added or substracted from the pan to bring the balance in equilibrium.

The invention also proposes a specific construction of the electromagnetic control of the rider to provide a quick and accurate placing of the rider on the scale of the beam, so that a decimal of a single division might be obtained accurately and quickly.

The invention proposes a certain arrangement of an electromagnetic starter, so that it serves the purpose of bringing the beam into oscillation in the case when the weights are so chosen that the balance is in equilibrium, or the weights are not sufficient to bring the balance into complete oscillation.

Still further the invention proposes a novel arrangement for illuminating the balance, and automatically extinguishing said illumination as required, so that the light will not interfere with the reading of the guiding light, or the reading of the reflected hair line.

Still further the invention proposes the construction of an analytical balance as mentioned which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 17 is a schematic side elevational view of the device, with another portion of the schematic wiring applied.

The analytical balance in accordance with this invention includes a casing 10 for housing various mechanisms of the balance. This casing is of box like construction and at the front it is provided with glass panels 11 so that part of the mechanism of the balance may be viewed. These panels are provided with glass doors 12 adapted to be opened so that the pans of the balance may be reached as hereinafter more fully described. The casing 10 is provided with a bottom section 10$^a$ in which certain of the mechanism of the balance is mounted. This mechanism is controlled by a knob 13 mounted upon the front of the section 10$^a$.

Figure 12:
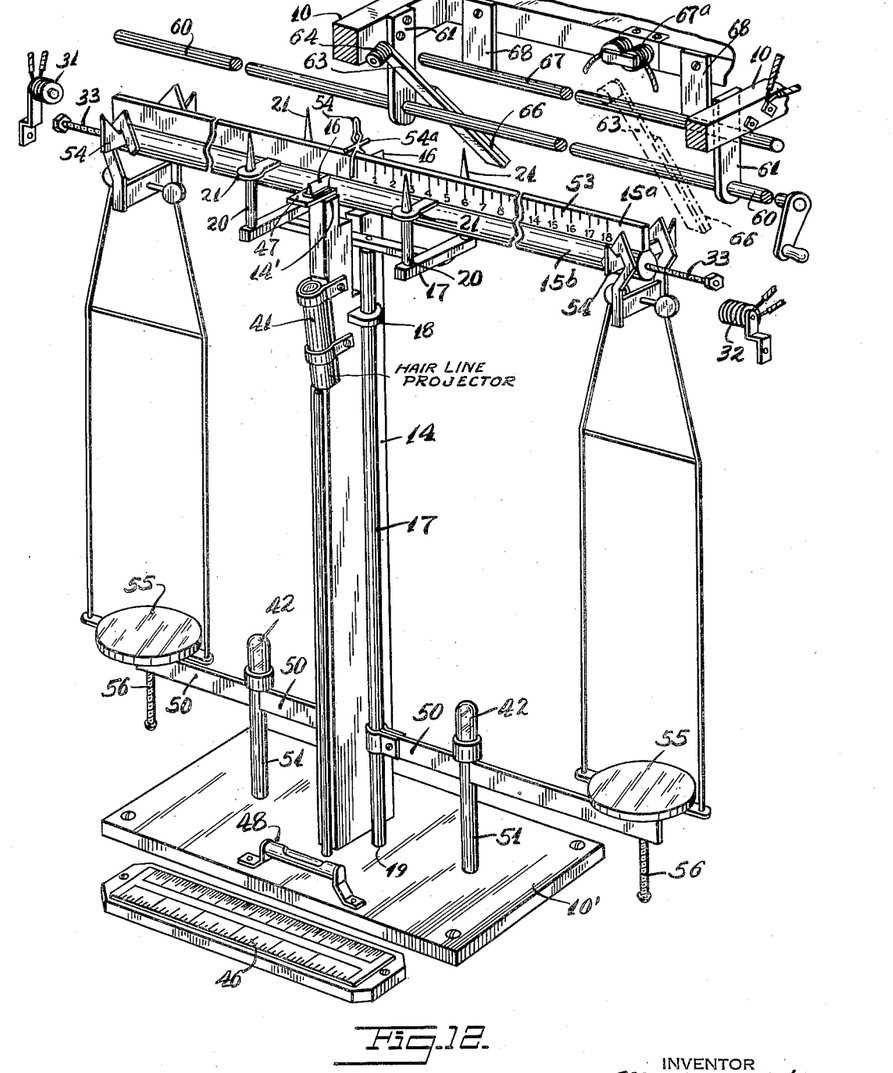
Fig. 12 is a schematic perspective view of certain of the parts of the analytical balance so that the operation thereof may be better understood.

A vertical support 14 is mounted within the casing 10 centrally thereof, and more specifically upon base plate 10' mounted on the top wall 10$^{aa}$ of the bottom section 10$^a$. A beam 15 is balanced at its center and is mounted upon the top of the vertical support 14. This beam 15 has a pair of knife edge members 16 mounted upon its front and rear faces at the center of gravity of the beam in a way so that the knife edges may rest upon glass pieces 14' mounted on the top of the support 14 to support the beam 15 in a balanced condition. (See Fig. 12.) A frame 17 is slidably mounted on the support 14. This frame includes several tubular members 17$^a$ which slidably engage through bearings 18 stationarily mounted on the support 14. The tubes 17$^a$ are also slidably mounted at their lower ends by engaging through openings 19 formed in the base plate 10' and top wall 10$^{aa}$ of the bottom section 10$^a$ of the casing 10.

Pointed elements 20 are mounted upon the frame 17 to the sides of the beam 15 and engage complementary elements 21 mounted upon the beam in a way so that the beam is maintained at a certain horizontal position upon the support 14. More specifically there are four elements 20. Two of these elements are arranged to the front of the beam and two to the rear. These elements are equally spaced from the support 14. These elements 20 have pointed upper ends. These points are adapted to engage the elements 21 which are mounted upon and project from the beam 15. In the raised position of the frame 17, the elements 20 and 21 are engaged with each other, and the beam 15 is held in the predetermined neutral position in the fulcrum knife edge elements 16 upon a certain line on the pieces 14' of the support 14. The frame 17 is arranged to be lowered to release the beam 15 so that it may oscillate. However each time that the frame 17 is raised the elements 20 and 21 engage each other to replace the beam in its correct position, if it happens to very slightly move out of its neutral position, during the oscillation of the beam.

Figure 13:
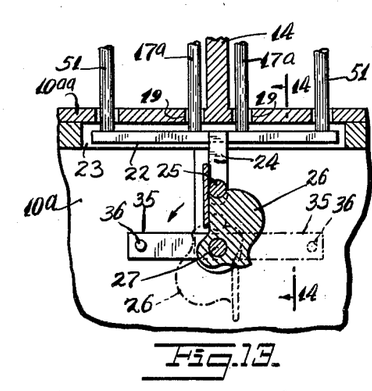
Fig. 13 is a fragmentary vertical sectional view taken on the line 13—13 of Fig. 9.

A means is provided for lowering the frame 17 to free the beam 15, as previously stated. This means includes a horizontal bar 22 normally located within a cavity 23 formed in the bottom face of the partition 10$^{aa}$ of the casing. The bottom ends of the tubular members 17$^a$ rigidly connect with the bar 22. Rods 24 project from the bottom of the bar 22 and their lower ends are provided with a roller 25. This roller engages a cam 26. The cam 26 is fixed upon a shaft 27 rotatively supported in a bottom portion 10$^a$ of the casing 10. This shaft 27 has a front end projecting from the casing. The knob 13 is mounted on the projecting end of the shaft 27. The cam 26 is shown in its neutral position in Figs. 3 and 13. In this position it holds the frame 17 raised. It is possible to turn the knob 13 anticlockwise and then the roller 25 will roll along the cam 26 which is shaped so as to gradually lower the frame 17.

Figure 14:
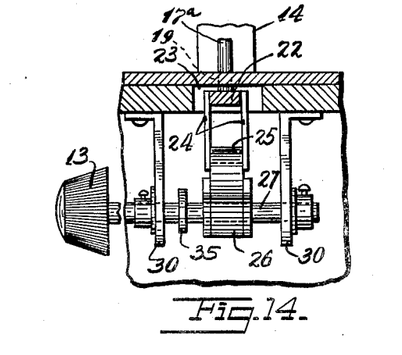
Fig. 14 is a fragmentary sectional view taken on the line 14—14 of Fig. 13.
Figure 15:
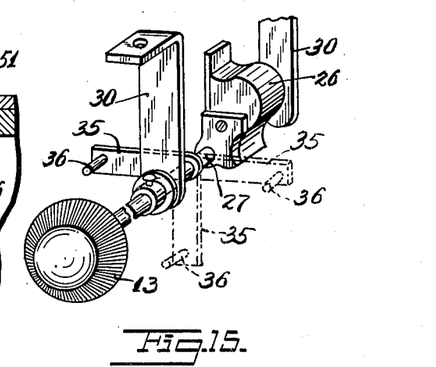
Fig. 15 is a fragmentary perspective view of a portion of the Fig. 14.

The shaft 27 is rotatively mounted in brackets 30, see Fig. 14, which are mounted upon the bottom face of the partition 10$^{aa}$. The roller 25 is mounted between the rods 24. The roller 25 rests upon the edge of the cam 26. The rods 24 are attached upon the sides of the bar 22.

Figure 3:
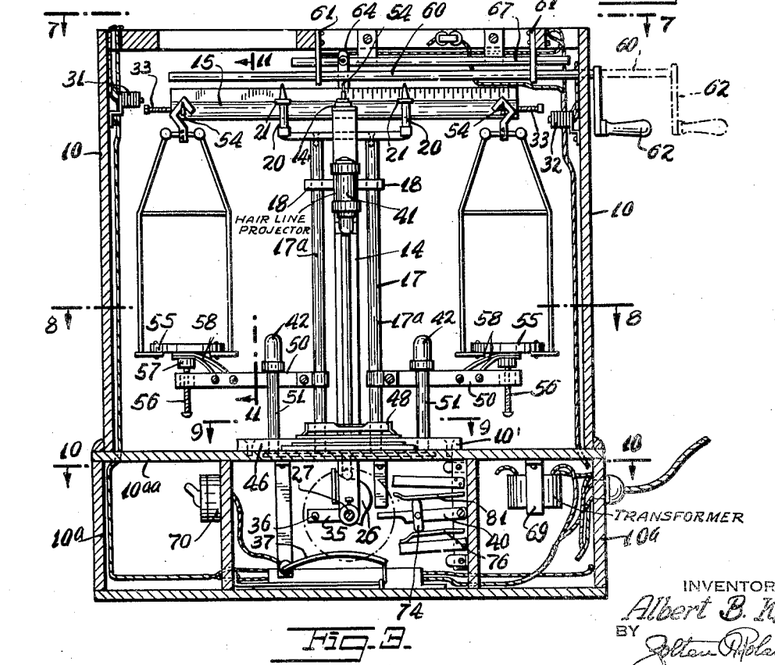
Fig. 3 is a transverse vertical sectional view taken on the line 3—3 of Fig. 2.

A means is provided for starting the beam 15 oscillating immediately upon its being released when the frame 17 is lowered. This means includes electromagnets 31 and 32 mounted upon the side walls of the casing 10 above and below respectively iron bolts 33 adjustably mounted on the ends of the beam 15. The electromagnets 31 and 32 are connected in a circuit which is controlled indirectly by turning the knob 13. This circuit will be explained in detail hereinafter. However at this point it should be noticed that a radial arm 35 is fixedly mounted on the shaft 27 and is provided with a pin 36 arranged to control the circuit which operates the electromagnets 31 and 32. The arm 35 is mounted at a position so that normally when the cam 26 holds the frame 17 in its raised position, see Fig. 13, the arm 35 extends horizontally outwards, as illustrated in Fig. 3, and is inoperative. As the knob 13 is turned to operate the cam to lower the frame 17, the pin 36 will first strike against and engage the controller 37. This controller is connected in the circuit of the electromagnets 31 and 32 to start the beam 15 oscillating as hereinafter more fully described.

An illuminating tube 39 is mounted across the top portion of the casing 10 and is adapted to light up the entire mechanism of the balance which is located in the upper portion of the casing. This illuminating tube is in a circuit as hereinafter more fully described. This circuit is controlled by an arm 40 operating certain contacts. Normally the arm 40 is in a lowered position in which position it controls the circuit of the illuminating lamp 39 so that the lamp is illuminated. However as the knob 13 is turned anti-clockwise, after the pin 36 passes the controller 37 it will next strike the arm 40 and lift the arm. This will cause the breaking of the circuit through the lamp 39 and will cause the closing of a circuit as hereinafter more fully described. This latter circuit controls a hairline projector 41 and guiding elements 42.

Figure 9:
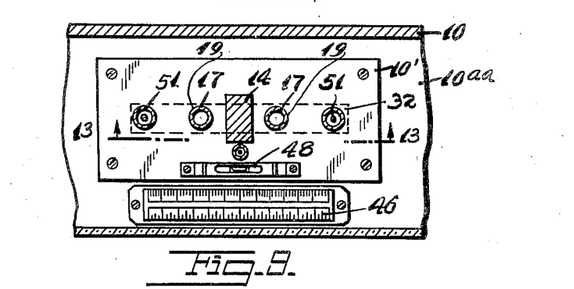
Fig. 9 is a fragmentary horizontal sectional view taken on the line 9—9 of Fig. 3.
Figure 10:
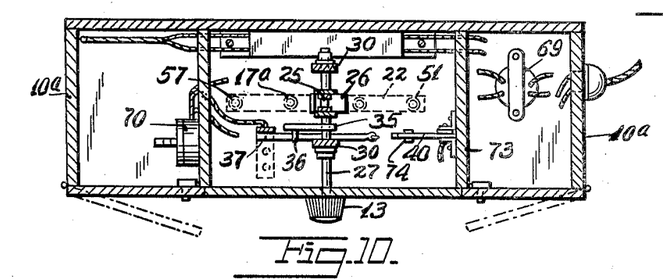
Fig. 10 is a horizontal sectional view taken on the line 10—10 of Fig. 3.
Figure 11:
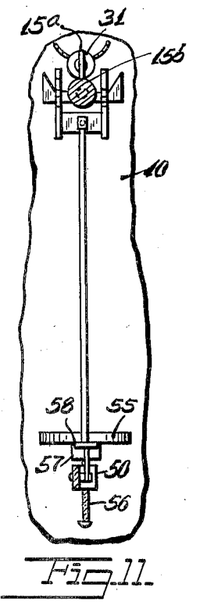
Fig. 11 is a fragmentary vertical sectional view taken on the line 11—11 of Fig. 3.

The hair line projector 41 is fixedly mounted upon the vertical support 14. The projector 41 is capable of throwing a hair line upon a mirror 43, see Fig. 17, which in turn is mounted upon one of the fulcrum knife members 45 which support the beam 15. These members 45 rest upon the top of the pieces 14' on the support 14 as previously explained. The mirror 43 is adapted to reflect the hair line downwards upon the index 46, which is mounted on the top wall of the partition 10$^{aa}$ of the bottom section of the casing 10. This index 46 is graduated as may be seen from inspecting Fig. 9. An air bubble liquid level 48 is also mounted upon the top wall 10$^{aa}$ of the casing 10 and is adapted to indicate whether or not the balance is properly rested. It must be rested on a level position to work accurately.

The guiding lights 42 are mounted upon arms 50 which are fixedly mounted on the frame 17 and extend laterally outwards. The arms 50 are reinforced by rods 51 which are connected with the bottom of the arms and which extend downwards and which connect with the bar 22.

Figures 4, 5:
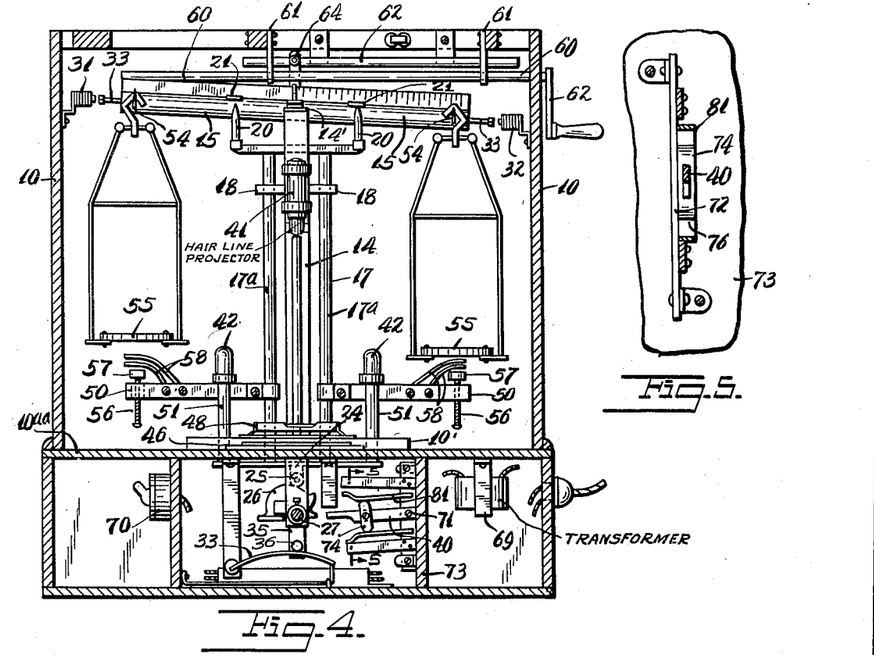
Fig. 4 is a view similar to Fig. 3 but illustrating the parts in a different position.
Fig. 5 is a fragmentary enlarged sectional view taken on the line 5—5 of Fig. 4.
Figure 6:
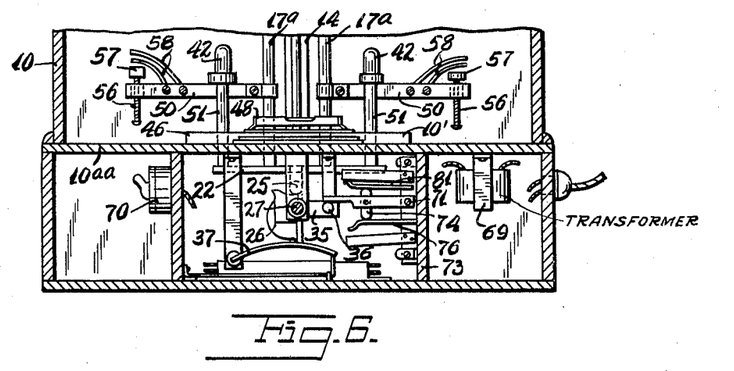
Fig. 6 is a fragmentary view similar to the lower portion of Fig. 4, but illustrating the parts in still another position.
Figure 7:
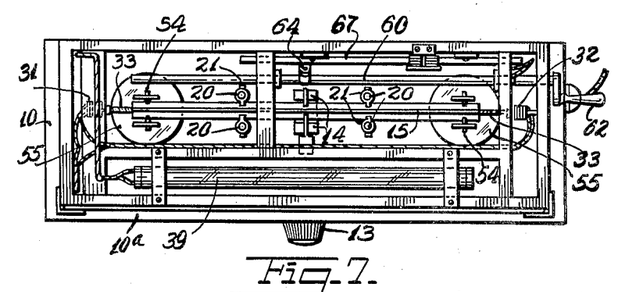
Fig. 7 is a plan view of the device looking in the direction of the line 7—7 of Fig. 3.
Figure 8:
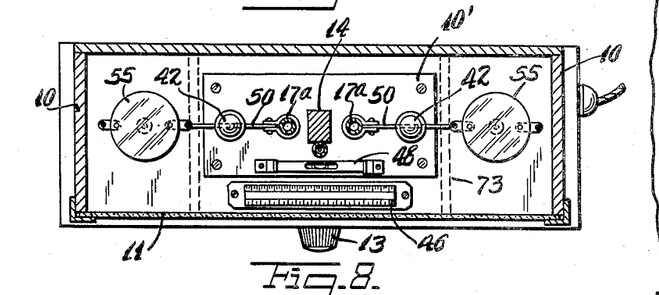
Fig. 8 is a horizontal sectional view taken on the line 8—8 of Fig. 3.

The beam 15 has a flat top section 15$^a$ which is calibrated with a scale 53 upon which the rider 54 functions. The beam 15 has a solid lower section 15$^b$. It is in this solid section that the iron bolts 33 are mounted at the ends of the beam 15. The beam 15 has projecting knife edge members 54. The pans 55 of the balance are suitably mounted on these knife members 54. The pans 55 are located at positions immediately above the extended ends of the arms 50. Each arm 50 is provided with a vertical screw 56 threadedly engaged and vertically adjustable. The upper ends of these screws have members 57 which are adapted to engage the bottom of the pans 55 to support the pans against oscillating while the frame 17 is in its raised position. Above each head member 57 there are a pair of contacts 58 which are normally separated as illustrated in Fig. 4, and which are engageable against the bottoms of the pans 55 and are then pressed together to contact each other. These contacts 58 are disposed in a circuit for controlling the guide lights 42 as hereinafter more fully described.

Electromagnetic means is provided for assisting in moving the rider 54. This electromagnetic means includes a rod 60 slidably and turnably supported in brackets 61 fixedly mounted upon the top portion of the casing 10. One end of the rod 60 projects from the body and is provided with a handle 62 by which the rod may be turned and longitudinally moved. A lever 63 is transversely fixed on the rod 60 and at its front end is provided with an electromagnet 64. This electromagnet 64 has a core 64$^a$ formed with a conical opening 65 into which the upper end of the rider 54 may engage.

Figures 1, 2:
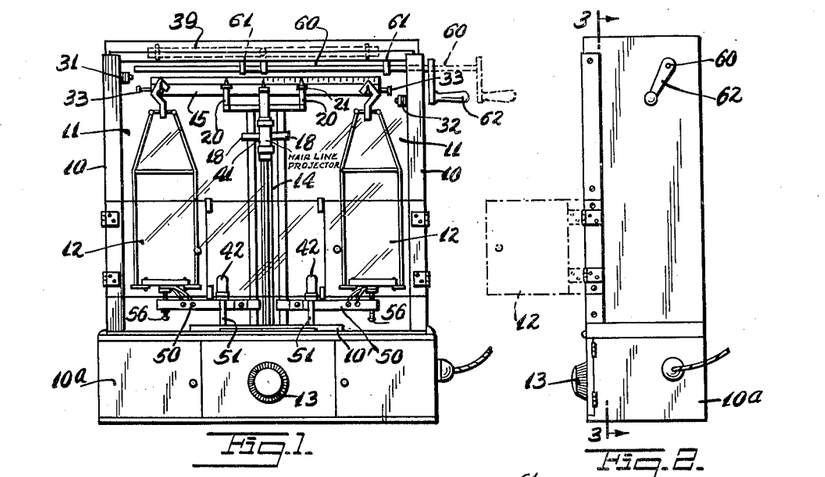
Fig. 1 is a front elevational view of an analytical balance constructed in accordance with this invention.
Fig. 2 is an end elevational view of Fig. 1.

The rider 54 comprises an aluminum wire bent upon itself so as to have front and rear arms which engage over the top edge of the portion 15$^a$ of the beam 15. An iron wire 54$^a$ is mounted transversely on the rider which is adapted to engage into the opening 65 of the electromagnet 64. The rear end of the arm 63 is provided with a contact 66 which in a certain position of turning of the rod 60 is adapted to engage a rail 67 stationarily mounted in the top portion of the body 10 and suitably insulated and engaged in an electric circuit as hereinafter more fully described. The rail 67 is supported by several insulated brackets 68 and is connected in series with a resistance 67$^a$, see Fig. 2, for reducing the current to the electromagnet 64.

The transformer 69 is mounted in the bottom portion of the casing 10. A main switch 70 is also mounted in the bottom portion of the casing 10. This main switch is for controlling the main circuit, see Fig. 16. The arm 40 is pivotally mounted by the pintle 71 at this rear end on a vertical bracket 72 secured on a transverse partition 73 mounted within the bottom portion of the casing 10. The arm 40 has a transverse insulation member 74 which is adapted to engage switches controlling a circuit as hereinafter more fully described.

Figure 16:
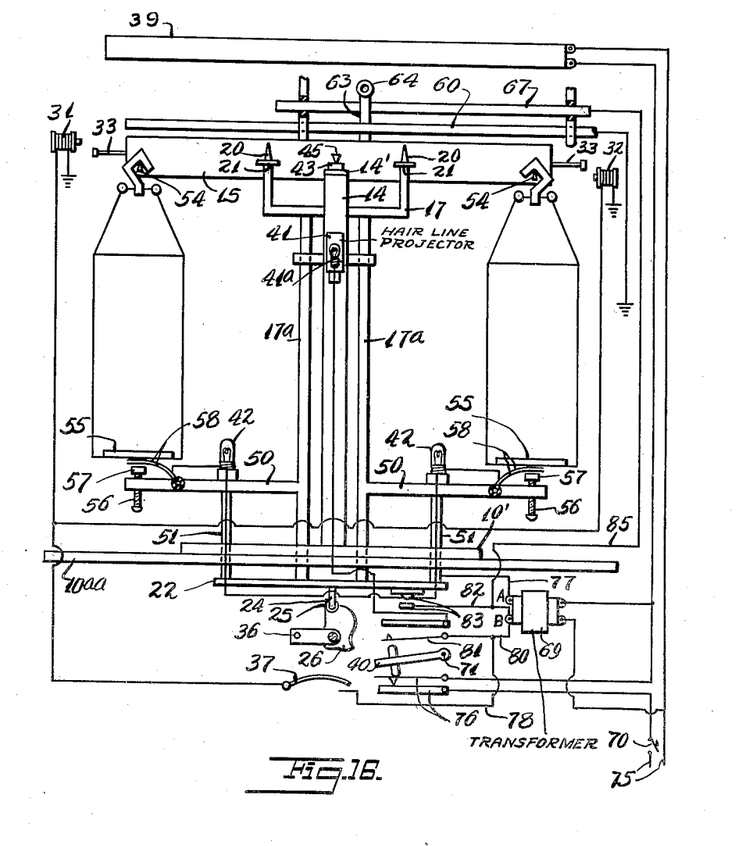
Fig. 16 is a schematic wiring diagram of the device.
Figure 18:
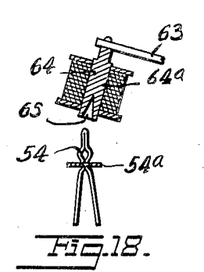
Fig. 18 is a fragmentary sectional view of a portion of the mechanism for controlling the rider of the beam.

Special reference is now had to the schematic wiring diagram shown in Fig. 16. This diagram discloses a 100 volt circuit indicated by reference 75. The primary of the transformer 69 is directly connected in the circuit 75. The circuit includes a switch 76 which is normally held closed by the weight of the arm 40. This switch 76 directly controls illumination of the lamp 39. When closed the lamp 39 is illuminated. The secondary of the transformer 69 has a grounded lead 77. The live terminal of the secondary winding of the transformer 69 is connected with several circuits, as follows:

There is a circuit 78 which includes the controller 37 and which includes one of the terminals of each of the electromagnets 31 and 32. The other terminals of the electro-magnets 31 and 32 are grounded. Another circuit 80 is connected with the live terminal of the secondary of the transformer and includes a switch 81 and a lamp 41$^a$ in the hair line projector 41. The other terminal of the lamp 41$^a$ is grounded. When the arm 40 is lifted by the pin 36 it will close the switch 81 and thus circuit 80.

Another circuit 82 is connected with the live terminal of the secondary winding of the transformer 69 and connects with the switch 83 which is in a circuit which includes the guiding lights 42. This circuit also includes the contacts 58, one of which is grounded and the other is the live contact. Another circuit 85 is connected with the live terminal of the secondary winding of the transformer 69 and this circuit 85 is connected with the rod 67 so that the current may flow to the contact 66 on the lever 63 when the rod 60 is turned. The rod 60 is grounded to complete the circuit.

The operation of the device is as follows:

The normal position of the various parts is shown in Fig. 3. To use the balance it is first necessary that the switch 70 be closed. Then the doors 12 may be opened and the object to be weighed may be placed on one of the pans 55.

Suitable counterbalance may be placed on the other of the pans. It is merely necessary to partially guess the quantity of counterweight to be placed on the latter mentioned pan. The knob 13 is then turned anti-clockwise for a distance sufficient to lower the frame 17 so that one of the pairs of contacts 58 disconnect from its pan 55. These contacts 58 are so constructed that as soon as they disconnect from the pan the circuit between the contacts is broken. Immediately this is indicated by one of the guiding lights 42. To obtain this operation however the switch 83 must be closed by the operation of the pin 36.

Suitable adjustment may now be made in the counterweights, more added or some substracted depending on the requirements, so that there is very close approximation of balance at the beam 15. When the knob 13 was turned anti-clockwise the pin 36 strikes the operator 37 closing the circuit 78. This immediately energizes the starter electromagnets 31 and 32 which draw the iron bolts 33 and start the beam 15 oscillating. The cam 26 at this point has sufficiently lowered the frame 17 so that the elements 20 are completely disengaged from the elements 21 of the beam 15 which is now free.

Turning of the knob 13 anti-clockwise causes the pin 36 to strike the arm 40 and open the switch 76. This interrupts the circuit through the illuminating tube which now goes out. Further turning of the knob 13 anti-clockwise closes the switch 81 which closes the circuit 80. This causes the hair line projector to function and throw the hair line upon the mirror 43. This hair line is reflected down to the indicator 46. Since the light 39 is now extinguished there will be no interference with a clear view of the hair line upon the indicator 46.

The beam 15 may now be brought into accurate balance by properly manipulating the handle 62. The handle 62 is manipulated so that the electromagnet 64 engages the rider 54. To do this it is necessary to turn the rod 60 and then the contact 66 engages the rail 67 closing the circuit through the electromagnet 64. It is now possible to pull the handle 62 forwards or rearwards so as to shift the rider 54 along the scale 53. Any time it is desired to see whether or not a correct balance has been effected it is merely necessary to turn the rod 60 by manipulating the handle 62 so that the lever 63 pivots off of the rider which is dropped because the circuit is broken by the contact 66 leaving the rail 67.

It is believed that further detailed operations of the analytical balance is not necessary since those familiar with the art will know how to properly work the apparatus.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. An analytical balance comprising a casing, a vertical support within said casing, a beam balanced at its center on the top of said support, a frame slidably mounted on said support and having pointed elements to the sides of the fulcrum of said beam engaging complementary elements on said beam for keeping the beam at a certain level on said support, means for lowering said frame to free said beam, means for starting said beam oscillating immediately upon being freed, a mirror on said beam at the fulcrum thereof, means mounted on said support for throwing the shadow of a hair line on said mirror, a scale upon which the reflection of said hair line may fall, a rider mounted on said beam, and electromagnetic means for assisting in moving said rider, said means for starting said beam oscillating including a pair of electro-magnets mounted upon said casing and cooperative with iron members mounted upon said beam.

2. An analytical balance comprising a casing, a vertical support within said casing, a beam balanced at its center on the top of said support, a frame slidably mounted on said support and having pointed elements to the sides of the fulcrum of said beam engaging complementary elements on said beam for keeping the beam at a certain level on said support, means for lowering said frame to free said beam, means for starting said beam oscillating immediately upon being freed, a mirror on said beam at the fulcrum thereof, means mounted on said support for throwing the shadow of a hair line on said mirror, a scale upon which the reflection of said hair line may fall, a rider mounted on said beam, and electromagnetic means for assisting in moving said rider, said means for starting said beam oscillating including a pair of electro-magnets mounted upon said casing and cooperative with iron members mounted upon said beam, said electro-magnets being located above and below the ends of said beams, respectively.

3. An analytical balance comprising a casing, a vertical support within said casing, a beam balanced at its center on the top of said support, a frame slidably mounted on said support and having pointed elements to the sides of the fulcrum of said beam engaging complementary elements on said beam for keeping the beam at a certain level on said support, means for lowering said frame to free said beam, an electro-magnetic means for starting said beam oscillating immediately upon being freed, a mirror on said beam at the fulcrum thereof, means mounted on said support for throwing the shadow of a hair line on said mirror, a scale upon which the reflection of said hair line may fall, a rider mounted on said beam, and electromagnetic means for assisting in moving said rider, said electro-magnetic means being in a circuit controlled by said means for lowering said frame.

4. An analytical balance comprising a casing, a vertical support within said casing, a beam balanced at its center on the top of said support, a frame slidably mounted on said support and having pointed elements to the sides of the fulcrum of said beam engaging complementary elements on said beam for keeping the beam at a certain level on said support, means for lowering said frame to free said beam, an electro-magnetic means for starting said beam oscillating immediately upon being freed, a mirror on said beam at the fulcrum thereof, means mounted on said support for throwing the shadow of a hair line on said mirror, a scale upon which the reflection of said hair line may fall, a rider mounted on said beam, and electro-magnetic means for assisting in moving said rider, said electro-magnetic means being in a circuit controlled by said means for lowering said frame, and an illuminating lamp for illuminating the entire of said body, a switch for controlling said lamp, and said switch being indirectly controlled by the operation of said means for lowering said frame.

5. An analytical balance comprising a casing, a vertical support within said casing, a beam balanced at its center on the top of said support, a frame slidably mounted on said support and having pointed elements to the sides of the fulcrum of said beam engaging complementary elements on said beam for keeping the beam at a certain level on said support, means for lowering said frame to free said beam, means for starting said beam oscillating immediately upon being freed, a mirror on said beam at the fulcrum thereof, means mounted on said support for throwing the shadow of a hair line on said mirror, a scale upon which the reflection of said hair line may fall, a rider mounted on said beam, and electromagnetic means for assisting in moving said rider, and means for throwing a shadow of a hair line including a projector having a lamp, a circuit for controlling said lamp which is controlled by a switch, and said switch being operable by a mechanism controlled by said means for lowering said frame.

6. An analytical balance comprising a body, a vertical support on said body, a beam balanced at its center on the top of said support, a frame slidably mounted on said support and having pointed elements to the sides of the fulcrum of said beam engaging complementary elements on said beam for keeping the beam at a certain point on said support, means for lowering said frame to free said beam, means for starting said beam oscillating immediately upon being freed, a mirror on said beam at the fulcrum thereof, means mounted on said support for throwing the shadow of a hair line on said mirror, a scale upon which the reflection of said hair line may fall, a rider mounted on said beam, and electromagnetic means for assisting in moving said rider, said rider comprising an aluminum wire, and an iron wire mounted on one point thereof.

7. An analytical balance comprising a casing, a vertical support within said casing, a beam balanced at its center on the top of said support, a frame slidably mounted on said support and having pointed elements to the sides of the fulcrum of said beam engaging complementary elements on said beam for keeping the beam at a certain level on said support, means for lowering said frame to free said beam, means for starting said beam oscillating immediately upon being freed, a mirror on said beam at the fulcrum thereof, means mounted on said support for throwing the shadow of a hair line on said mirror, a scale upon which the reflection of said hair line may fall, a rider mounted on said beam, and electromagnetic means for assisting in moving said rider, said rider comprising an aluminum wire, and an iron wire mounted on one point thereof, said means for moving the rider including a turnable and slidable rod supporting a lever carrying an electro-magnet adapted to contact the iron portion of said rider, and a circuit for the electromagnet including a rail against which said lever may be engaged when said rod is turned.

8. An analytical balance comprising a casing, a vertical support within said casing, a beam balanced at its center on the top of said support, a frame slidably mounted on said support and having pointed elements to the sides of the fulcrum of said beam engaging complementary elements on said beam for keeping the beam at a certain level on said support, means for lowering said frame to free said beam, means for starting said beam oscillating immediately upon being freed, a mirror on said beam at the fulcrum thereof, means mounted on said support for throwing the shadow of a hair line on said mirror, a scale upon which the reflection of said hair line may fall, a rider mounted on said beam, and electromagnetic means for assisting in moving said rider, and trays mounted upon the ends of said beam, and indicator means operative with said trays for indicating which side of the balance is heavier.

9. An analytical balance comprising a casing, a vertical support within said casing, a beam balanced at its center on the top of said support, a frame slidably mounted on said support and having pointed elements to the sides of the fulcrum of said beam engaging complementary elements on said beam for keeping the beam at a certain level on said support, means for lowering said frame to free said beam, means for starting said beam oscillating immediately upon being freed, a mirror on said beam at the fulcrum thereof, means mounted on said support for throwing the shadow of a hair line on said mirror, a scale upon which the reflection of said hair line may fall, a rider mounted on said beam, and electromagnetic means for assisting in moving said rider, and trays mounted upon the ends of said beam, and indicator means operative with said trays for indicating which side of the balance is heavier, said indicator means including lamps in a circuit controlled by contacts normally engaged against the bottom of said trays.

10. An analytical balance comprising a casing, a vertical support within said casing, a beam balanced at its center on the top of said support, a frame slidably mounted on said support and having pointed elements to the sides of the fulcrum of said beam engaging complementary elements on said beam for keeping the beam at a certain level on said support, means for lowering said frame to free said beam, means for starting said beam oscillating immediately upon being freed, a mirror on said beam at the fulcrum thereof, means mounted on said support for throwing the shadow of a hair line on said mirror, a scale upon which the reflection of said hair line may fall, a rider mounted on said beam, and electromagnetic means for assisting in moving said rider, and trays mounted upon the ends of said beam, and indicator means operative with said trays for indicating which side of the balance is heavier, said indicator means including lamps in a circuit controlled by contacts normally engaged against the bottom of said trays, and said contacts being mounted upon said frame to be moved out of contact with the trays when the frame is moved downwards.

11. An analytical balance comprising a casing, a vertical support within said casing, a beam balanced at its center on the top of said support, a frame slidably mounted on said support and having pointed elements to the sides of the fulcrum of said beam engaging complementary elements on said beam for keeping the beam at a certain level on said support, means for lowering said frame to free said beam, means for starting said beam oscillating immediately upon being freed, a mirror on said beam at the fulcrum thereof, means mounted on said support for throwing the shadow of a hair line on said mirror, a scale upon which the reflection of said hair line may fall, a rider mounted on said beam, and electromagnetic means for assisting in moving said rider, and trays mounted upon the ends of said beam, and indicator means operative with said trays for indicating which side of the balance is heavier, said indicator means including lamps in a circuit controlled by contacts normally engaged against the bottom of said trays, and said contacts being mounted upon said frame to be moved out of contact with the trays when the frame is moved downwards, each of said contacts being flexible and adapted to move upwards as the frame is moved downwards.

ALBERT B. KISH.